(12) United States Patent
Weiss (10) Patent No.: US 10,897,911 B2
(45) Date of Patent: Jan. 26, 2021

(54) DISPENSING UNIT FOR BAKED PRODUCTS

(71) Applicant: R. WEISS VERPACKUNGSTECHNIK GMBH & CO. KG, Crailsheim (DE)

(72) Inventor: Reinald Weiss, Schopfloch (DE)

(73) Assignee: R. WEISS VERPACKUNGSTECHNIK GMBH & CO. KG, Crailsheim (DE)

(*) Notice: Subject to any disclaimer, the term of this patent is extended or adjusted under 35 U.S.C. 154(b) by 267 days.

(21) Appl. No.: 15/752,540

(22) PCT Filed: Aug. 9, 2016

(86) PCT No.: PCT/EP2016/068965
§ 371 (c)(1),
(2) Date: Feb. 13, 2018

(87) PCT Pub. No.: WO2017/025537
PCT Pub. Date: Feb. 16, 2017

(65) Prior Publication Data
US 2019/0008165 A1 Jan. 10, 2019

(30) Foreign Application Priority Data
Aug. 13, 2015 (DE) .......................... 10 2015 113 401

(51) Int. Cl.
*A21B 3/07* (2006.01)
*G07F 17/00* (2006.01)
(Continued)

(52) U.S. Cl.
CPC ................. *A21B 3/07* (2013.01); *A21B 1/48* (2013.01); *A21B 7/00* (2013.01); *A21C 9/083* (2013.01);
(Continued)

(58) Field of Classification Search
CPC .... A21B 3/07; A21B 7/00; A21B 1/48; G07F 17/0064; G07F 11/06; G07F 11/58;
(Continued)

(56) References Cited

U.S. PATENT DOCUMENTS 5,439,134 A * 8/1995 Tsuda ..................... G07F 11/10
221/75
2012/0111698 A1 * 5/2012 Weiss ..................... A21B 1/48
198/602

FOREIGN PATENT DOCUMENTS

DE          20302346 U1      4/2003
DE   102005012821 A1 * 11/2005  .............. G07F 11/32
(Continued)

OTHER PUBLICATIONS

International Search Report dated Nov. 3, 2016 for PCT/EP2016/068965.
(Continued)

*Primary Examiner* — Ryan J. Walters
(74) *Attorney, Agent, or Firm* — Kevin E. West; Advent, LLP (57) ABSTRACT

Dispensing units for baked products, in particular, baguettes, and devices for dispensing baked products which include a dispensing unit are described. Such dispensing units can be found, for example, in supermarkets, with a continuous baking oven being connected upstream of said dispensing units. At a customer's request by pushing on a button it is possible for various, freshly baked or crisped-up baked products to be dispensed from the dispensing unit.

15 Claims, 4 Drawing Sheets

(51) Int. Cl.
  *G07F 11/06* (2006.01)
  *G07F 11/58* (2006.01)
  *G07F 11/10* (2006.01)
  *A21B 7/00* (2006.01)
  *A21B 1/48* (2006.01)
  *A21C 9/08* (2006.01)
  *A47F 3/02* (2006.01)
  *B65G 49/05* (2006.01)

(52) U.S. Cl.
  CPC .............. *G07F 11/06* (2013.01); *G07F 11/10* (2013.01); *G07F 11/58* (2013.01); *G07F 17/0064* (2013.01); *G07F 17/0078* (2013.01); *A47F 2003/021* (2013.01); *B65G 49/05* (2013.01)

(58) Field of Classification Search
  CPC ..... G07F 11/10; G07F 17/0078; A21C 9/083; A47F 2003/021; B65G 49/05
  See application file for complete search history.

(56) References Cited

FOREIGN PATENT DOCUMENTS

| | | | |
|---|---|---|---|
| DE | 102005012821 A1 | 11/2005 | |
| DE | 102005005193 A1 | 8/2006 | |
| DE | 102005057866 A1 | 6/2007 | |
| DE | 102009026620 A1 | 12/2010 | |
| EP | 0755032 A2 | 1/1997 | |
| EP | 1577848 A1 * | 9/2005 | ............. G07F 11/06 |
| EP | 1612746 A1 | 1/2006 | |
| EP | 1688042 A2 | 8/2006 | |
| EP | 1577848 B1 | 11/2007 | |

OTHER PUBLICATIONS

International Preliminary Report on Patentability dated Feb. 22, 2018 for PCT/EP2016/068965.

Search Report dated Jun. 21, 2016 for German Appln. No. 102015113401.2.

* cited by examiner

DISPENSING UNIT FOR BAKED PRODUCTS

BACKGROUND

Dispensing units for baked products can include at least one column in which at least two turnstiles with horizontally oriented axes of rotation are arranged above one another. The turnstiles define a plurality of separate compartments in the column, with the products being transferred from one compartment of a first turnstile into a subsequent compartment of a second turnstile, this being achieved by rotating the turnstile by an angular amount which corresponds to the size of a compartment if the last compartment in the direction of rotation is determined to be empty. Here, after they have left the last compartment of a turnstile, products are transferred into the first compartment of the subsequent turnstile via an inclined plane. A disadvantage with such a dispensing unit is that the products carry out relatively many transverse and rotational movements which, on the one hand, are time-consuming and, on the other hand, increase the risk that the crust of the baked products will be damaged given the many contacts with machine parts. In addition, the space requirement for the dispensing unit is relatively large on account of the turnstiles.

BRIEF DESCRIPTION OF THE DRAWINGS

The Detailed Description is explained in more detail in the exemplary embodiments which follow. In the figures.

DETAILED DESCRIPTION

Aspects of this disclosure relate to a dispensing unit and a device for dispensing baked products which has a small space requirement and allows baked products to be dispensed quickly and gently.

The dispensing unit according to the disclosure has at least two adjacently and substantially vertically extending, non-crossing first and second discharging paths in the housing which guide the baked products to a dispensing device arranged in or on the housing. This results in a particularly space-saving design of the dispensing unit. Thus, each of the discharging devices can serve as a store for baked products. In particular, if a baked product is received in each discharging device, it is possible for a plurality of baked products to be stockpiled. A customer who requests baked products promptly obtains the desired number since said baked products already lie available in the discharging devices.

Furthermore, the first and the second discharging device of each of the two discharging paths each include precisely one compartment for receiving at least one respective baked product, wherein the compartments of the respective first and second discharging device are situated directly opposite one another in the vertical direction according to the disclosure. In addition, the first and the second discharging device of each of the at least two discharging paths each have transfer means by means of which the received baked products can be passed on downwardly. The transfer means according to the disclosure can each assume a retaining position for holding back the corresponding baked product in a rest position, and a release position for releasing said baked product from its rest position. Here, at first, the baked products are passed on directly—i.e. without a reversal of direction of the baked products or a significant displacement in the horizontal direction—from an upper compartment of the discharging device to the compartment of the discharging device situated closest further below until the last, in particular the lowermost, discharging device in the discharging path has been reached. If the last discharging device has been reached, the baked products are transferred to a dispensing device. As a result, the baked products can be guided from top to bottom through the discharging paths to the dispensing device. The baked products made available can be removed by the customer via the dispensing device.

In embodiments, the arrangement of the compartments—a single one per discharging device—with respect to one another and the transfer movement of the transfer means ensure that the baked products are dispensed in a short time, quickly, in a space-saving manner and with little damage to the baked products.

In some embodiments, upon an actuation of the transfer means, the baked products can leave their rest position vertically downward. Thus, the baked product experiences—at least additionally—no transverse impulse, either in the form of a rotational movement or through displacement in the horizontal direction. Instead, the baked product can drop vertically downward, for example the total drop path to the next discharging device or—if said discharging device is the last in the discharging path—to the dispensing device extends vertically. In such a design, the transport paths of the baked products upon transfer from the respective first discharging device to the second discharging device and then further from the second discharging device are aligned with one another.

A purely vertical movement of the baked products from their rest position in one discharging device to the rest position in a subsequent discharging device allows that the discharging devices, and thus the discharging paths, can be designed in a particularly space-saving manner since the baked products are subjected neither to a rotational movement nor displaced horizontally.

In addition, the baked products can be guided directly and without delay through the discharging paths, in particular through the discharging devices. Here, the baked products can drop from a compartment of an upper discharging device to a compartment of a lower discharging device which in turn directly thereafter guides the baked product further downward, either to the next underlying discharging device (if this is not already occupied by one or more baked products) or to the dispensing device. Alternatively, the transfer means can be actuated in such a way that the baked products drop from top to bottom through the discharging paths without the baked products colliding with a component of the dispensing unit. Here, the transfer means are all in their release position so as to form a drop shaft. Here, such a dispensing of baked products can be concluded in a particularly quick manner. However, care should be taken to ensure that such a relatively long drop does not lead to damage to the baked product, for example flaking of the crust.

By means of the exclusively vertical movement of the baked products out of a discharging device, the movement distance thereof is reduced to a minimum. A displacement of the baked products in the discharging paths is thus avoided. There results a time saving and a minimization of damage to the baked products.

In some embodiments, the at least two discharging paths are arranged next to one another along the front section of the housing or behind one another with respect to said front section. If the discharging paths are arranged behind one another for example, the dispensing unit can be designed with a more compact width. The term "behind one another" can also be understood to mean that the two discharging paths arranged behind one another in this respect share the lowermost discharging device, for example; above this discharging device, there can be provided two discharging devices which are arranged behind one another and which each guide the baked products to the lowermost discharging device.

If, by contrast, the discharging paths are arranged next to one another, the overall depth of the dispensing unit can be lower. In both cases, it is possible to store for example at least four baguettes—with in each case one baguette in each of the at least two discharging devices—via each of at least two discharging paths, with the result that at least four baguettes requested by customers can be dispensed extremely quickly.

According to an alternative embodiment, both at least two discharging paths are provided next to one another along the front section of the housing and in each case a further discharging path is provided behind each of said discharging paths. For example, a storage stock of eight baguettes can be realized by this respective 2×2-arrangement (overall 2×2×2) of the discharging paths as viewed from above and from the side, it also being possible, on account of this large number, for the dispensing unit to be equipped with different baguette varieties. For example, four baguettes of French type and four baguettes of the stone oven type can be held available in the dispensing unit.

In some embodiments, the discharging devices of two adjacently arranged discharging paths which extend along the front section of the housing have different widths. Thus, for example, the discharging devices of a discharging path can be designed to be very wide to hold available thin, but long French baguettes, whereas narrower discharging devices next to it or behind it for shorter baguettes can be provided. Overall, an optimization of the width of the dispensing unit (the footprint in supermarkets should always be kept as low as possible) with at the same time a large product variety is thus achievable.

The transfer means can each include at least one flap, which is can be in the form of a two-leaf flap, which pivots downward from the retaining into the release position. Here, the flap is arranged on an underside of the respective discharging device and can be rotated in a particularly simple manner by a servomotor and/or by a pneumatic piston.

The at least one flap and/or all the flaps can have a respective support surface on which the baked product to be discharged rests in the retaining position of the respective discharging device. Upon actuation of the respective flap, the baked product then drops downward from this rest position. The support surface can be horizontally formed, for example. According to one of a number of alternatives, a cross-sectionally funnel-shaped design of two plates or the like, which together form the support surface for a baked product, is also possible.

As an alternative to a flap, there can be provided, for example, a laterally displaceable slide which can also be designed such that it can be activated by a servomotor and/or a pneumatic piston. If, here, the slide is pushed forward into the discharging device, the slide is in the retaining position and the baked product in the rest position. In the retracted state, said slide is in the release position.

Furthermore, at least one discharging path can have arranged there below a transfer device, for example in the form of a conveyor belt and/or of a chute, by means of which the baked products are guided in the direction of the dispensing device. Thus, it is possible for example for different varieties of baked products to be brought together.

If the dispensing device includes a dispensing compartment directly below the discharging devices, this is accompanied by further space savings. Additionally or alternatively, the dispensing device can include a transfer device, for example a conveyor belt and/or a chute, which leads to the dispensing compartment. If the dispensing compartment is arranged spatially remote from the dispensing unit, a transport of the baked products by means of the transfer device can allow a customer to remove the baked products more conveniently from the dispensing compartment.

Within the scope of the present disclosure, there is furthermore proposed a device for dispensing baked products, in particular baguettes, comprising a stock unit in which the baked products can be at least temporarily stockpiled. The stock unit makes it possible to stockpile sufficient baked products at any time, with the result that even a large number of orders of many customers can be handled without relatively long waiting times. Furthermore, the device includes at least one feed device which guides the baked products from the stock unit to a dispensing unit as described above.

The stock unit can include a continuous baking oven in which a relatively large number of baked products of different varieties can be baked or crisped up, simultaneously and continuously. Thus, the continuous baking oven can be referred to as a stock unit, since constantly fresh baked products can be subsequently delivered. Additionally, or alternatively, the stock unit can include a revolving conveyor having a plurality of carriers which is connected downstream of the continuous baking oven, wherein the baked products can be mounted on the carriers. The revolving conveyor is a closed conveyor which moves, for example with the aid of chains, on a circular, an elliptical and/or oval path. The carriers are arranged on the revolving conveyor such that baked products situated thereon are transported endlessly in circulation before they are guided to the dispensing unit.

If required, the baked products are then pushed and/or guided by one or more feed devices from the continuous baking oven and/or from the carriers of the revolving conveyor to the dispensing unit.

According to an embodiment of the disclosure, said feed device includes a linear conveyor which can be designed as a conveyor belt. The linear conveyor has low space requirements. Additionally, or alternatively, the feed device can also be designed as a product pusher which pushes the baked products by means of a pushing movement from and/or out of the stock unit to the dispensing unit. In an embodiment in this respect, the feed device is provided above (not necessarily exactly above; a lateral offset is also possible) at least two discharging paths which are arranged behind one another with respect to the front section of the housing and can be designed as a linear pusher. Here, the feed device serves for feeding baked products—for example in the transverse direction thereof—to the uppermost discharging devices in order to equip the dispensing unit. Here, the product pusher or linear pusher can be designed in such a way that the baked products can be pushed in the direction of the front section of the housing to two discharging devices, which are situated substantially at the same height, of two different discharging paths. On the one hand, the product pusher or linear pusher can push the baked products to the first (here the uppermost) discharging device of the first discharging path and also—past the aforementioned discharging path—to the first (here the uppermost) discharging device of the second discharging path. The baked products can then be passed on downward from the respective first discharging device.

Figure 1:
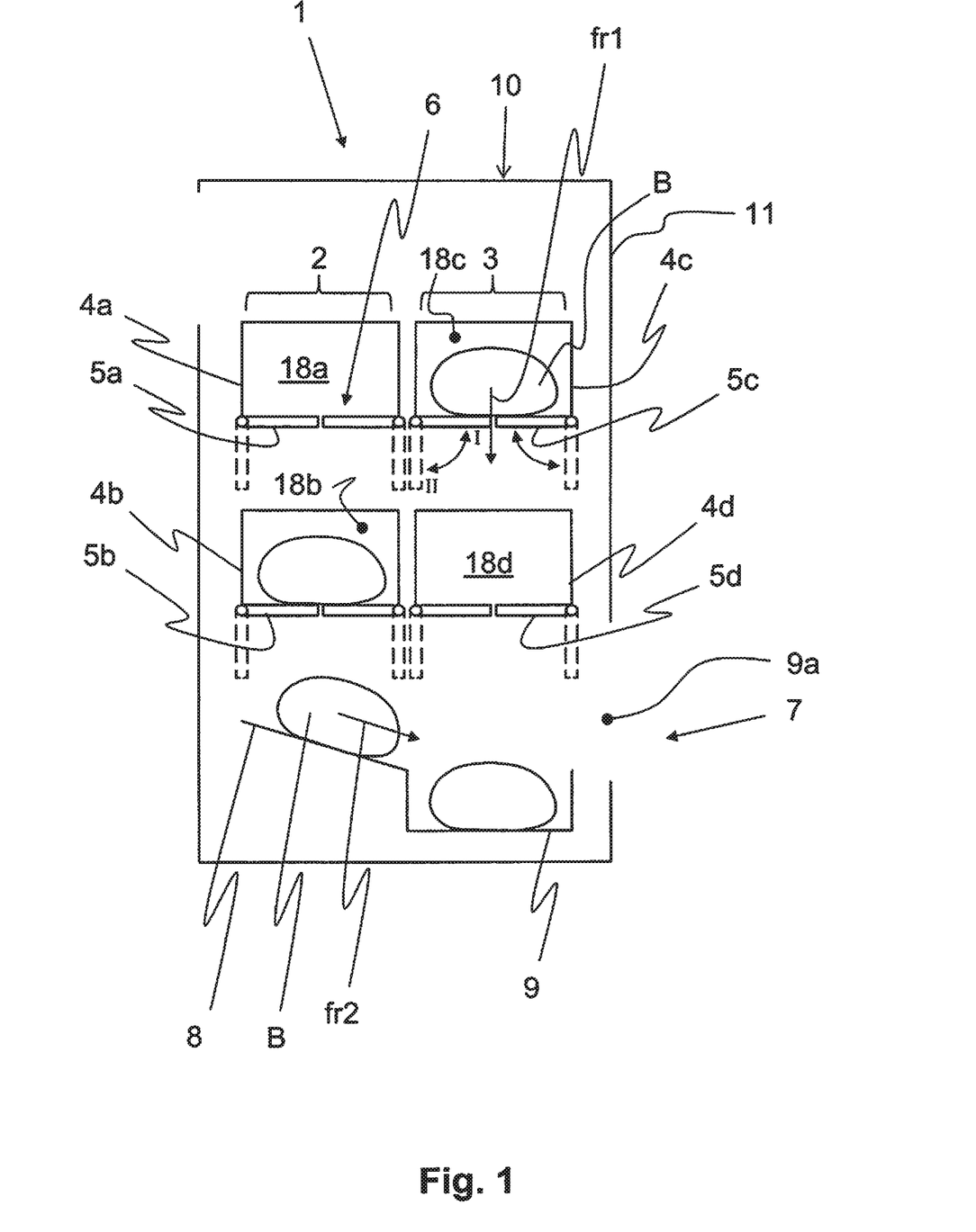
FIG. 1 shows a side view of a dispensing unit for baked products.

FIG. 1 illustrates a side view of a dispensing unit 1 for baked products B. For the sake of simplicity, only individual baked products B are provided with a reference sign here and in the following figures. In the exemplary embodiments of FIGS. 1 and 3, the dispensing unit 1 includes two respective discharging paths, namely the first discharging path 2 and the second discharging path 3. The discharging paths 2, 3 each include a first and a second discharging device 4a, 4b or 4c, 4d, with the discharging devices 4a, 4b being assigned to the discharging path 2 and the discharging devices 4c, 4d being assigned to the discharging path 3. It is also possible here for the discharging paths 2, 3 to include more than two discharging devices (see FIG. 2). Furthermore, each discharging device 4a-4d has respective transfer means 5a-5d by means of which the baked products B can be passed on downward.

The dispensing unit 1 with its different discharging paths 2, 3 is accommodated in a housing 10 which has a front section 11 which is oriented toward the customer side in a supermarket and has, in particular, information panels, baked product request operating elements and an access to the dispensed baked products.

In the present case, the discharging devices 4a-4d have compartments 18a-18d with vertical walls, whereas the transfer means 5a-5d close off the compartments 18a-18d on the underside. The compartments 18a, 18b or 18c, 18d of a respective discharging path 2 or 3 are situated directly opposite one another in the vertical direction. In the present case, the transfer means 5a-5d take the form of two-leaf flaps which are arranged in such a way that a support surface 6 is formed on their upper side (for the sake of simplicity, again only one support surface 6 is provided with a reference sign). The baked products B lie on the supporting surface 6 such that they are held by the transfer means 5a-5d in the compartments 18a-18d of the discharging devices 4a-4d. Upon an actuation of the transfer means 5a-5d, they can be moved from a retaining position I into a release position II. In the exemplary embodiments illustrated in FIGS. 1-3, the flaps can be pivoted downward from the retaining position I into the release position II. In the retaining position I, the baked products B are retained in the discharging devices 4a-4d, and in the release position II, the baked products B are passed on vertically downward, with the baked products B dropping freely.

For example, by means of actuation of the transfer means 5c, the baked product B from the second discharging device 4c executes only a movement vertically downward in the conveying direction fr1. The baked product B passes into the discharging device 4d, with it coming to lie on the support surface 6 of the transfer means 5d. Actuating the transfer means 5d causes the baked product B to be passed on downward, with the baked product B arriving at a dispensing device 7. In general, a baked product B within a discharging path can be passed on in cascade fashion from one discharging device to that situated below.

Alternatively, the transfer means 5d can also be arranged in the release position II during this operation, with the result that the baked product B drops through the discharging device 5d and passes directly to the dispensing device 7. If, thus, a baguette is requested from the lower discharging device 4b or 4d and then a second, the second baguette can drop directly from the upper discharging device 4a or 4c to the dispensing device. In general terms, the transfer means of all the discharging devices of a discharging path can be in the release position, with the result that the baked products drop from top to bottom through this discharging path, in particular without impinging against transfer means or thereby being hindered in the vertical movement.

In the present exemplary embodiment, the dispensing device 7 includes a transfer device 8 in the form of a chute and a dispensing compartment 9 which is accessible to a customer via a removal opening 9a at the front section 11 of the housing 10. Baked products B from the discharging device 4b drop onto the chute and slide in the conveying direction fr2 thereon to the dispensing compartment 9. By contrast, baked products from the discharging device 4d drop directly into the dispensing compartment 9.

In an alternative exemplary embodiment which is not illustrated, the transfer device 8 is designed for example as an in particular horizontal conveyor belt which receives the baked products from the discharging devices 4b, 4d and conveys them to a more remotely situated dispensing compartment 7, where the baked products B can be removed by a customer.

Figure 2:
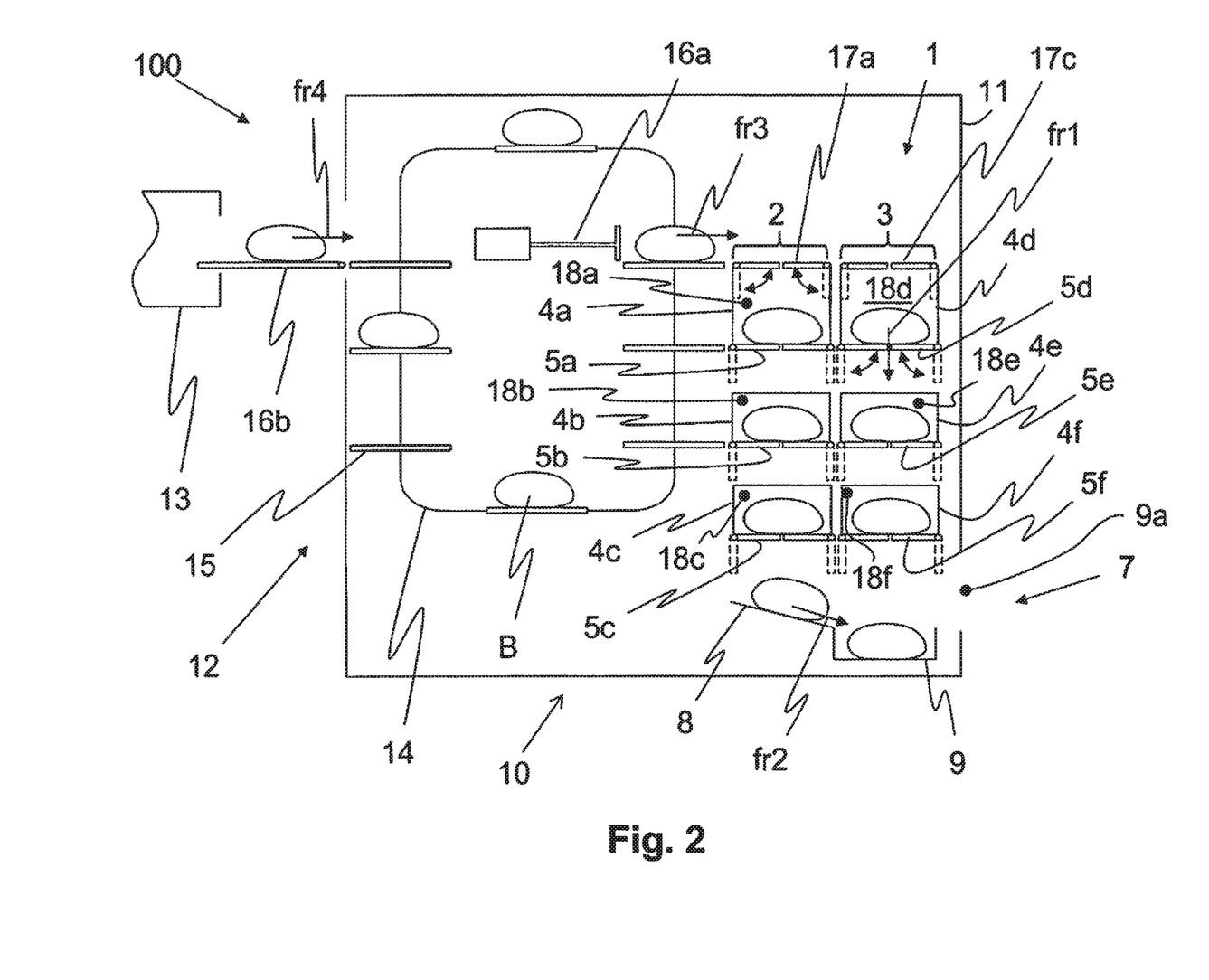
FIG. 2 shows a side view of a device for dispensing baked products having a stock unit and a dispensing unit.

FIG. 2 shows a side view of a device 100 for dispensing baked products B that has a stock unit 12 and a dispensing unit 1. In this exemplary embodiment, the stock unit 12 includes a continuous baking oven 13, in which the baked products B are freshly baked or crisped up, and a revolving conveyor 14. The baked products B pass from the continuous baking oven 13 to the revolving conveyor 14, which has a plurality of carriers 15 on which the baked products B are transported by the revolving conveyor 14 on a, for example, oval circulation path.

In the present case, the baked products B are first guided in the conveying direction fr4 by a feed device 16b, which takes the form of a conveyor belt in this exemplary embodiment, from the continuous baking oven 13 to the carriers 15 of the revolving conveyor 14.

If, during their circulation, the baked products B on the carriers 15 have arrived at the height of the discharging devices 4a, 4c, a feed device 16a, which is here designed as a product pusher, pushes the baked products B in the conveying direction fr3 to the dispensing unit 1. Here, the product pusher can push the baked products B to the discharging path 2 or to the discharging path 3. In particular, for this purpose, the uppermost discharging devices 4a, 4c have on their upper side a respective closure device 17a, 17c, with the result that a baked product B can be pushed over and beyond the closure device 17a to the closure device 17c without the baked product B already dropping beforehand into the discharging device 4a. The closure devices 17a, 17c can be designed as flaps which, upon an actuation, for example upon being pivoted, release the baked products B downward, with the result that they pass into the compartment 18a or 18c of the respective discharging device 4a, 4c. Here, the baked products B execute only a vertical movement in the downward direction.

Since a plurality of baked products B are baked or crisped up simultaneously and continuously in the continuous baking oven 13, the continuous baking oven 13 can likewise serve for stockpiling baked products B. In an alternative exemplary embodiment, the baked products B can therefore be guided directly from the continuous baking oven 13 to the dispensing unit 1, with the result that the device 100 can be designed in an even more space-saving manner. The continuous baking oven 13 can be designed in terms of size and/or output in such a way that always sufficient baked products B are simultaneously or successively baked or crisped up and stockpiled, with the result that the customer orders can be handled in a desired time. For this purpose, the feed device 16b can lead directly up to the dispensing unit 1 from the continuous baking oven 13, with the result that the baked products B pass over a short path from the continuous baking oven 13 to the dispensing unit 1.

If the baked products have then arrived in the compartments 18a, 18c of the uppermost discharging devices 4a, 4c, depending on free discharging devices they can be passed through downwardly successively into the compartments 18b or 18e of the discharging devices 4b or 4e and further into the compartments 18c or 18f of the discharging devices 4c or 4f by means of the transfer means 5a-5f, with the result that the baked products B are capable of completely filling the dispensing unit 1. In this exemplary embodiment, the dispensing device 7 again includes a dispensing compartment 9 which is charged from above with baked products B from the discharging device 4c via a ramp 8 or directly from the discharging device 4f.

A sensor system in conjunction with a control device can determine how many baked products B are optimally held available in the discharging devices 4a-4f at what times (for example in coordination with customer frequency and purchasing behavior). During periods of low purchasing activity, it is sufficient for example to equip only two or three of the discharging devices 4a-4f, whereas at peak times all six discharging devices 4a-4f are used to hold baked products B available.

The aforementioned control device is also responsible for initiating and outputting the commands to the various pushers, conveyors, transfer means, etc. and also for processing the customer requests.

As already indicated, in the exemplary embodiment according to FIG. 2 each discharging path 2, 3 includes three discharging devices 4a-4c or 4d-4f, with the result that at least six baked products B can be stored in the discharging paths 2, 3 such that once again a customer order or a plurality of customer orders in succession can be handled more quickly. Alternatively, it is also possible of course for even more discharging devices to be arranged in the dispensing unit 1, with the result that even more baked products B can be temporarily stored.

Figure 3:
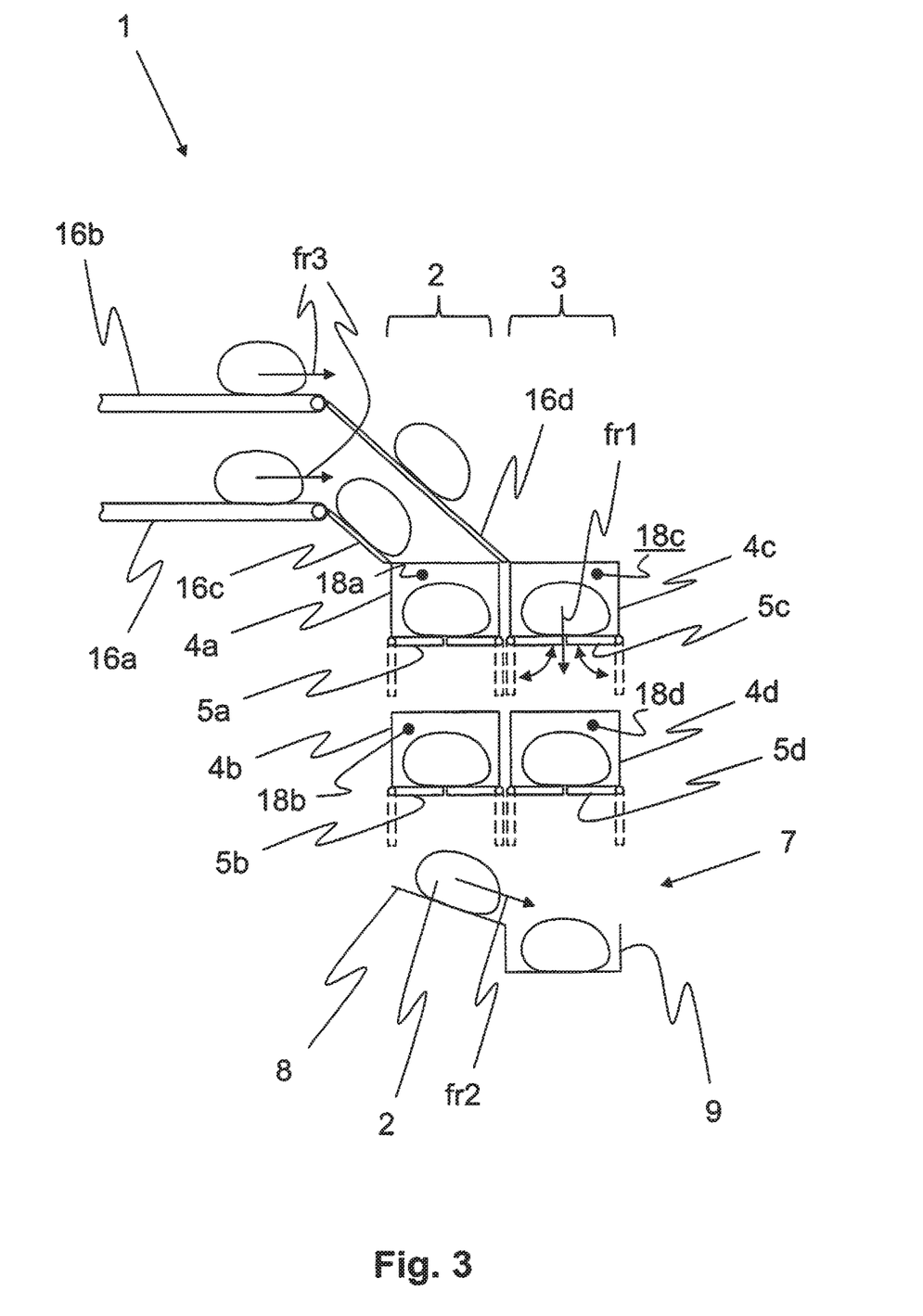
FIG. 3 shows a side view of a further dispensing unit for baked products.

FIG. 3 shows a further dispensing unit 1 for baked products B (but not the housing). Here, the dispensing unit 1 includes two discharging paths 2, 3 (see FIG. 1) which have two respective discharging devices 4a, 4b or 4c, 4d. In the manner already described, the baked products B are again guided through the discharging paths 2, 3 to the dispensing device 7. The baked products B pass to the respective discharging paths 2, 3 of the dispensing unit 1 by means of feed devices 16a, 16b including ramps 16c, 16d (as part of the feed devices). The feed devices 16a, 16b are arranged above one another such that the feed device 16a can be assigned to the discharging path 2 and the feed device 16b can be assigned to the discharging path 3. In this exemplary embodiment, the feed devices 16a, 16b include conveyor belts which guide the baked products B in the conveying direction fr3 to the dispensing unit 1 via the ramps 16c, 16d.

The feed devices 16a, 16b can, for example, deliver the baked products directly from a continuous baking oven 13 (cf. FIG. 2). Alternatively, the baked products B can also be delivered from two different continuous baking ovens. For example, a first variety of baked products, for example relatively long baguettes, is guided from a first continuous baking oven to the dispensing unit 1 via the feed device 16a and a second variety of baked products, for example short baguettes, is guided from a second continuous baking oven to the dispensing unit 1 via the feed device 16b. Different baguette varieties can of course also be baked in a single continuous baking oven.

Alternatively, the baked products B could also be pushed by two feed devices in the form of product pushers from two carriers 15 onto the ramps 16c, 16d.

In one embodiment which is not illustrated, at least one transfer device is arranged between at least two adjacently arranged discharging paths, with the result that baked products can be guided from one discharging path to the other discharging path. It is thus possible, for example in the case of damage to and/or failure of a discharging device, for the baked products to be diverted around it. The transfer device could, for example, include a pivotable guide plate which is pivoted under a discharging device of one discharging path such that the baked products slide over the guide plate into the discharging device of the other discharging path. The pivot point of the guide plate can be arranged between the two discharging paths, with the result that the guide plate can be pivoted into both discharging paths.

Figure 4:
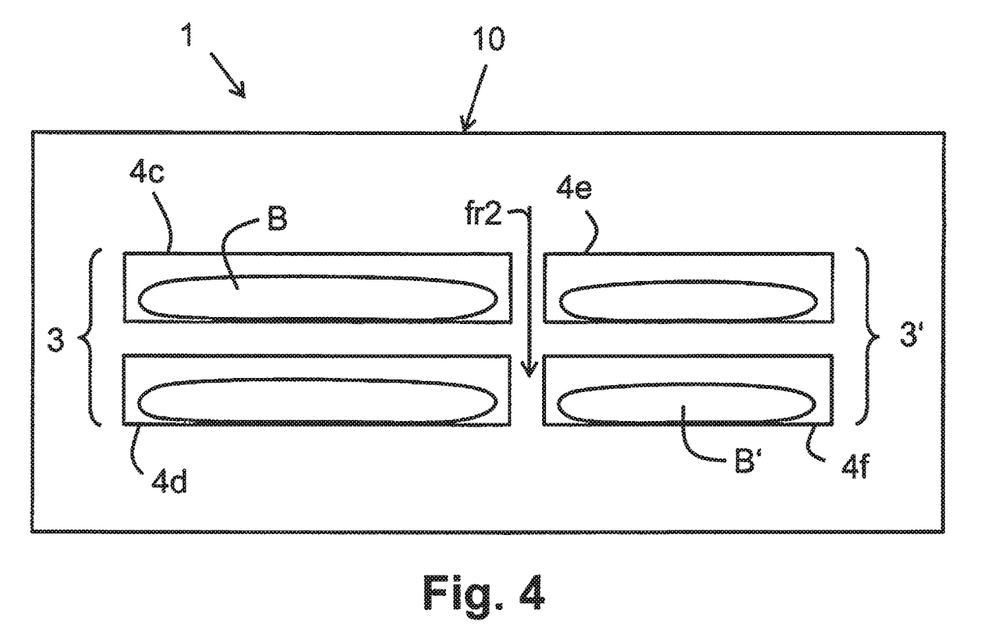
FIG. 4 shows a schematic front view of a dispensing unit having two discharging paths extending next to one another.

FIG. 4 schematically illustrates a front view of a dispensing unit 1 according to the disclosure, with the front section 11 of the housing 10 having been removed such that the discharging paths 3 and 3' are visible. They each include, as described above, two first and second discharging devices 4c, 4d arranged above one another and—arranged adjacent thereto and next to one another along the front section 11 of the housing 10—two first and second discharging devices 4e, 4f placed above one another. The width of the discharging devices 4c, 4d is greater than the width of the discharging devices 4e, 4f. It is possible for example for long baguettes to be transported in the wider discharging devices 4c, 4d and for short baguettes to be transported in the narrower discharging devices 4e, 4f. The total width of the housing 10 is thereby optimized since the width of the discharging devices is tailored to the width of the baked products.

Figure 5:
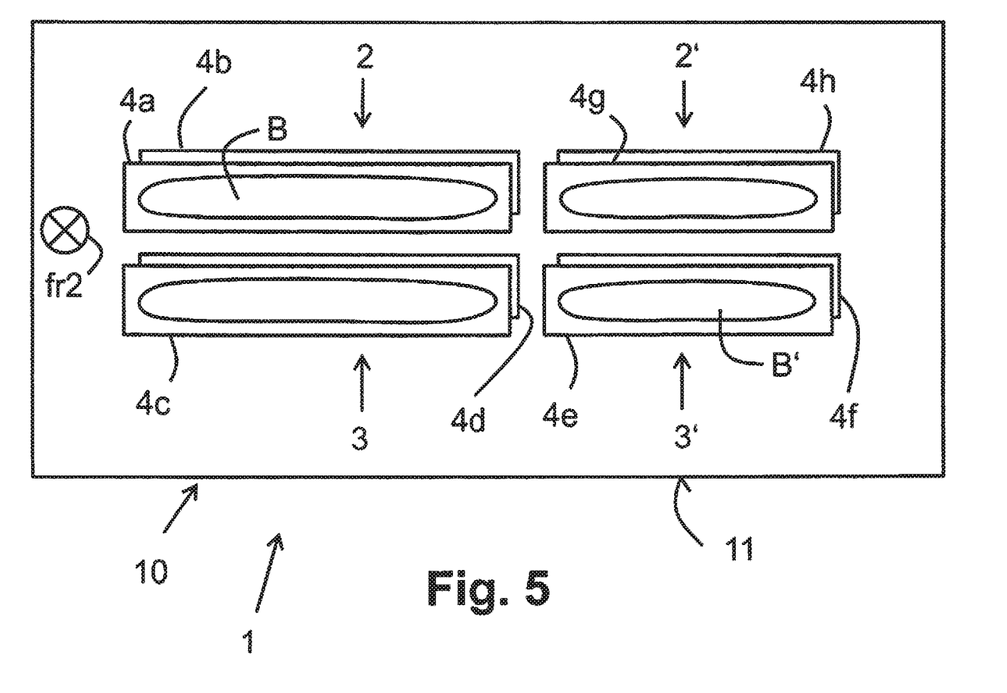
FIG. 5 shows a schematic plan view of a dispensing unit having two discharging paths extending next to one another and two discharging paths extending behind one another.

FIG. 5 illustrates a schematic plan view of four discharging paths 4a-4h in a housing 10 (cover wall of the housing removed). Along the and in the direct vicinity of the front section 11 of the housing 10 there are provided two discharging paths 3, 3' whose first discharging devices 4c or 4e are arranged at the very top. Below these, the second discharging devices 4d or 4f are respectively indicated (in a slightly perspective illustration). Behind each of the discharging paths 3 or 3', and perpendicular to the front section 11, there is respectively provided a further discharging path 2 or 2', each of which in the present case likewise includes two discharging devices 4a, 4b or 4g, 4h arranged above one another. In the present case, the transfer means 5a-5h are not illustrated (as is also the case in FIG. 4). The dispensing unit 1 thus has eight storage spaces since each discharging device 4a-4h can hold available baked products, for example one baguette each. Longer baguettes (but naturally also shorter ones) can be stored in the discharging paths 4a-4d and shorter baguettes can be stored in the discharging paths 4e-4h. If customers request baguettes from the lower discharging devices 4b, 4d, 4f, 4h, these discharging devices can be replenished from the ones situated above, while the last-mentioned ones in turn are supplied by at least one continuous baking oven (see FIGS. 2 and 3), with the result that a large number of baguettes is always present. Order bottlenecks can thus be very effectively prevented.

By virtue of the design according to the disclosure of the dispensing unit 1 and of the device 100, it is possible with minimum space for many baked products to be stored in a gentle manner and to be quickly and simply dispensed.

The present disclosure is not limited to the represented and described exemplary embodiments. Modifications within the scope of the patent claims are just as possible as a combination of the features even if these are represented and described in different exemplary embodiments.

LIST OF REFERENCE SIGNS

1 Dispensing unit
2, 2', 3, 3' Discharging paths
4a-4h Discharging devices
5a-5f Transfer means
6 Support surface
7 Dispensing device
8 Transfer device
9 Dispensing compartment
9a Removal opening
10 Housing
11 Front section
12 Stock unit
13 Continuous baking oven
14 Revolving conveyor
15 Carrier
16a-16d Feed devices
17a, 17c Closure devices
18a-18d Compartments
100 Device
I Retaining position
II Release position
B Baked product
fr1-fr4 Conveying directions

What is claimed is:

1. A dispensing unit for baked products, comprising:
a housing having a front section, the housing comprising a first discharging path and a second discharging path the first discharging path and the second discharging path being adjacently and substantially vertically extending and non-crossing, the first discharging path being arranged behind the second discharging path with respect to the front section of the housing;
a first discharging device and at least a second discharging device provided along each of the first discharging path and the second discharging path, respectively, the first discharging device and at least a second discharging device each comprising:
 a compartment for receiving at least one of the baked products, the compartments of the first discharging device and the at least a second discharging device being situated opposite one another in a vertical direction; and
 a transfer element configured to assume a retaining position for holding back the baked product in a rest position, and a release position for releasing the baked product from the rest position, wherein moving the transfer element of the respective first discharging device from the retaining position to the release position drops the baked product out of the compartment of the first discharging device into the compartment of the second discharging device; and
a dispensing device coupled with the housing for receiving baked products guided from the first discharging path and the second discharging path, the dispensing device including a chute positioned below the first discharging path and a dispensing compartment positioned below the second discharging path, the chute for transporting the baked product from a lowest compartment of the first discharging path to the dispensing compartment.

2. The dispensing unit for baked products of claim 1, wherein the at least a second discharging device is arranged below the first discharging device.

3. The dispensing unit for baked products of claim 1, wherein the first discharging device and the at least a second discharging device and the respective transfer elements are arranged such that movement of the transfer element of the first discharging device from the retaining position into the release position causes the at least one of the baked products to leave their rest position in the vertical direction and pass downward into the compartment of the respective second discharging device.

4. The dispensing unit for baked products of claim 3, wherein the at least one of the baked products pass downward through an exclusively vertical movement.

5. The dispensing unit for baked products of claim 1, wherein a further discharging path is arranged behind each of the first discharging path and the at least a second discharging path.

6. The dispensing unit for baked products of claim 1, wherein the first discharging device and the at least a second discharging device provided along the first discharging path have a different width than the first discharging device and the at least a second discharging device provided along the at least a second discharging path.

7. The dispensing unit for baked products of claim 1, wherein the first discharging device and the at least a second discharging device extend at least one of along or parallel to the front section of the housing.

8. The dispensing unit for baked products of claim 1, wherein the transfer element comprises at least one flap configured to pivot downward from the retaining position into the release position.

9. The dispensing unit for baked products of claim 8, wherein the at least one flap comprises a two-leaf flap.

10. The dispensing unit for baked products of claim 8, wherein at least one of the at least one flap has a respective support surface on which the at least one of the baked products to be discharged rests in the rest position in the retaining position of the respective discharging device of the first discharging device and the at least a second discharging device, and which drops downward upon actuation of the respective at least one of the at least one flap.

11. A dispensing device for baked products, comprising:
a stock unit for temporarily stockpiling baked products;
a dispensing unit comprising:
 a housing having a front section, the housing comprising at least a first discharging path and a second discharging path, each of the at least a first discharging path and a second discharging path being adjacently and substantially vertically extending and non-crossing;
 a first discharging device and at least a second discharging device provided along each of the first discharging path and the second discharging path, the first discharging device and at least a second discharging device each comprising:
- a compartment for receiving at least one of the baked products, the compartments of the first discharging device and the at least a second discharging device being situated opposite one another in a vertical direction;
- a transfer element; configured to assume a retaining position for holding back the baked product in a rest position, and a release position for releasing the baked product from the rest position, wherein moving the transfer element of the respective first discharging device from the retaining position to the release position drops the baked product downward out of the compartment of the first discharging device into the compartment of the second discharging device;
- a dispensing device coupled with the housing for receiving baked products guided from the first discharging path and the second discharging path, the dispensing device including a chute positioned below the first discharging path and a dispensing compartment positioned below the second discharging path, the chute for transporting the baked product from a lowest compartment of the first discharging path to the dispensing compartment; and
- at least one feed device which guides the bake products from the stock unit to the dispensing unit.

12. The dispensing device for baked products of claim 11, wherein the stock unit further comprises at least one of a continuous baking oven or a revolving convey having a plurality of carriers.

13. The dispensing device for baked products of claim 11, wherein the at least one feed device comprises at least one of a linear conveyor or a pusher which executes a linear pushing movement in order to displace the baked products.

14. The dispensing device for baked products of claim 11, wherein the at least one feed device is formed above the at least a first discharging path and a second discharging path, the at least a first discharging path and a second discharging path being arranged behind one another with respect to the front section of the housing, wherein the at least one feed device can convey the baked products in a direction of the front section of the housing to the first discharging device of the first discharging path and also to the first discharging unit of the second discharging path.

15. A dispensing unit for baked products, comprising:
- a housing having a front section, the housing comprising at least four discharging paths, each of the at least four discharging paths being adjacently and substantially vertically extending and non-crossing;
- a first discharging device and at least a second discharging device provided along each of the at least four discharging paths, each of the first discharging device and at least a second discharging device each comprising:
- a compartment for receiving at least one of the baked products, the compartments of the first discharging device and the at least a second discharging device being situated opposite one another in a vertical direction; and
- a transfer element configured to assume a retaining position for holding back the baked product in a rest position, and a release position for releasing the baked product from the rest position, wherein moving the transfer element of the respective first discharging device from the retaining position to the release position drops the baked product downward out of the compartment of the first discharging device into the compartment of the second discharging device; and
- a dispensing device coupled with the housing for receiving baked products guided from the first discharging path and the second discharging path, the dispensing device including a chute positioned below the first discharging path and a dispensing compartment positioned below the second discharging path, the chute for transporting the baked product from a lowest compartment of the first discharging path to the dispensing compartment.

* * * * *